United States Patent
Arato

(10) Patent No.: US 6,738,389 B1
(45) Date of Patent: *May 18, 2004

(54) CIRCUIT AND METHOD FOR PERFORMING PARTIAL PARALLEL DATA TRANSFER IN A COMMUNICATIONS SYSTEM

(75) Inventor: Lazslo Arato, Tinton Falls, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/164,850

(22) Filed: Oct. 1, 1998

Related U.S. Application Data

(60) Provisional application No. 60/060,651, filed on Oct. 1, 1997.

(51) Int. Cl.[7] .............................. H04J 3/00; H04J 3/22; G06F 13/38
(52) U.S. Cl. ........................ 370/466; 370/476; 370/472; 710/66; 710/71
(58) Field of Search ................................ 370/465–467, 370/476, 506, 463, 391, 423, 359, 472; 455/557; 709/230, 249–250; 710/129, 105, 66, 64, 71, 307, 100; 714/819–820; 712/300

(56) References Cited

U.S. PATENT DOCUMENTS

| | | | | |
|---|---|---|---|---|
| 4,016,548 A | * | 4/1977 | Law et al. ................... | 370/476 |
| 5,293,381 A | * | 3/1994 | Choy ........................... | 370/537 |
| 5,517,436 A | * | 5/1996 | Andreas et al. ............ | 708/524 |
| 5,588,010 A | * | 12/1996 | Hardell et al. ............... | 714/757 |
| 5,771,377 A | * | 6/1998 | Ando ........................... | 395/586 |
| 6,009,552 A | * | 12/1999 | Ariel et al. .................. | 714/780 |

OTHER PUBLICATIONS

Al Chamé, "Applications Information Interfacing the 68360 (QUICC) to T1/E1 Systems," Motorola Semiconductor Technical Information, http://www.mot.com/netcom/docs/pubs/360toT1.html, Dec. 4, 1996.

"Communications Processor Module (CPM)," Motorola MC68360 Quad Integrated Communications Controller User's Manual, rev. 1, ch. 7, Dec. 4, 1996, pp. 7–1–7–381.

* cited by examiner

*Primary Examiner*—Seema S. Rao
*Assistant Examiner*—Ronald Abelson
(74) *Attorney, Agent, or Firm*—Thomas, Kayden, Horstemeyer & Risley

(57) ABSTRACT

A system and method to perform partial byte writes in a processor circuit is disclosed. The system comprises a bit assembly circuit having a bit assembly register with a corresponding shadow register. Also included is a bit routing circuit configured to transfer at least one data bit from a data bus to a predetermined register position in the bit assembly register and a shadow bit from the data bus to a corresponding register position in the shadow register. The shadow bit indicates that the data bit written comprises valid data. The bit assembly and shadow registers may receive data directly from the data bus as well. Using this circuitry, a partial parallel data block is assembled in the bit assembly register. Thereafter, the partial parallel data block is transferred to a destination register via the data bus with corresponding shadow bits being transmitted to the destination shadow register. The valid data is processed accordingly.

22 Claims, 1 Drawing Sheet

CIRCUIT AND METHOD FOR PERFORMING PARTIAL PARALLEL DATA TRANSFER IN A COMMUNICATIONS SYSTEM

CROSS REFERENCE TO RELATED APPLICATIONS

This application claims the benefit of United States provisional patent application entitled "Programmable Framer for HDSL Transmissions" filed on Oct. 1, 1997 and afforded Ser. No. 60/060,651, the entire text of which is incorporated herein by reference.

STATEMENT REGARDING FEDERALLY SPONSORED RESEARCH OR DEVELOPMENT

Not Applicable.

TECHNICAL FIELD

The present invention relates to the field of data communications, and more particularly, to the field of framing data in a communications system.

BACKGROUND INFORMATION

In data communications, data is generally transmitted in a serial communications format through current networks. It is often the case that the data to be transmitted between two data endpoints is packaged according to specific data communications protocols to facilitate the transmission across the particular network in question. This packaging may include the addition of network management and other information such as headers and trailers to the data to facilitate transmission based upon the dictates of the particular protocol employed. Such packaging is generally termed "framing" in the art.

Some of these protocols may include, for example, data transmission using time division multiplexing (TDM) approaches such T1 and E1 standards known in the art. Other example standards may include high-level data link control (HDLC) or asynchronous transfer mode (ATM). Each of these protocols have their own applications and goals in terms of history, performance, error-immunity, flexibility, and other factors. Consequently, each of these protocols employ framing procedures by which data is packaged for transmission across the various networks employed. These protocols are generally incompatible and require translation or conversion to transmit data in a transmission link that employs two or more protocols in two or more different segments.

The conversion from one protocol to another requires specific framing technology to accomplish the task. With a myriad of standards between which conversion is possible, many different dedicated protocol conversion units have been developed to accomplish the specific conversion tasks presented. The typical protocol conversion unit is labeled "dedicated" above because such units generally employ dedicated circuits which are capable only of performing the conversion from one specific protocol to another. The result of this fact is a multitude of protocol conversion units on the market to accomplish the individual conversion tasks, thereby diminishing efficiencies to be obtained by mass production.

It is also the case that new communications standards are developed as data communication technology develops over time. Often times, a particular standard may be in flux while discussion ensues among those skilled in the art until agreement on concrete provisions articulating a standard is reached. Consequently, it is difficult to develop data communications technology that employs an up and coming standard until the standard is settled. In the competitive world of data communications technology production, it is desirable to produce products to meet these new standards as quickly as is possible after a standard is finalized so as to compete in the marketplace.

However, many data communications protocols are not particularly suited for processing as they employ odd numbers of data blocks for various signaling and other functions that with bit sizes that do not match the data bus of conventional programmable processors. As a result, an inordinate amount of processor time is necessary to achieve data protocol conversions in such settings.

BRIEF SUMMARY OF THE INVENTION

In light of the foregoing, it is an objective of the present invention to provide for technology which is programmable to achieve protocol conversions between any number of protocols to obtain the efficiencies of mass production and feature the flexibility allowing the unit to be quickly adapted to new data communications protocols as they develop.

In addition, another objective of the present invention is to provide for a protocol conversion unit which is programmable to convert a first data communications protocol into a second communications protocol that employs a processor with less than full parallel data transfer to facilitate the conversion without requiring an inordinate amount of processor time.

In furtherance of these and other objectives, the present invention entails a system to perform partial byte writes in a processor circuit. The system comprises a bit assembly circuit having a bit assembly register with a corresponding shadow register. Also included is a bit routing circuit configured to transfer at least one data bit from a data bus to a predetermined register position in the bit assembly register with a corresponding shadow bit written to the shadow register. The shadow bit indicates that the data bit written comprises valid data. The bit assembly and shadow registers may receive data directly from the data bus as well.

Using this circuitry, a partial parallel data block is assembled in the bit assembly register. Thereafter, the partial parallel data block is transferred to a destination register via the data bus with corresponding shadow bits being transmitted to the destination shadow register. The valid data is processed accordingly.

In accordance with another aspect of the present invention, a method is provided for performing a partial parallel data transfer which comprises the steps of assembling a partial parallel data block for transfer to a destination register, transferring the partial parallel data block to the destination register, and finally, indicating the validity of a data bit in the partial parallel data block transferred to the destination register.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The invention can be better understood with reference to the following drawing. The components in the drawing are not necessarily to scale, emphasis instead being placed upon clearly illustrating the principles of the present invention. In the drawings, like reference numerals designate corresponding parts throughout the several views.

DETAILED DESCRIPTION OF THE INVENTION

Figure 1:
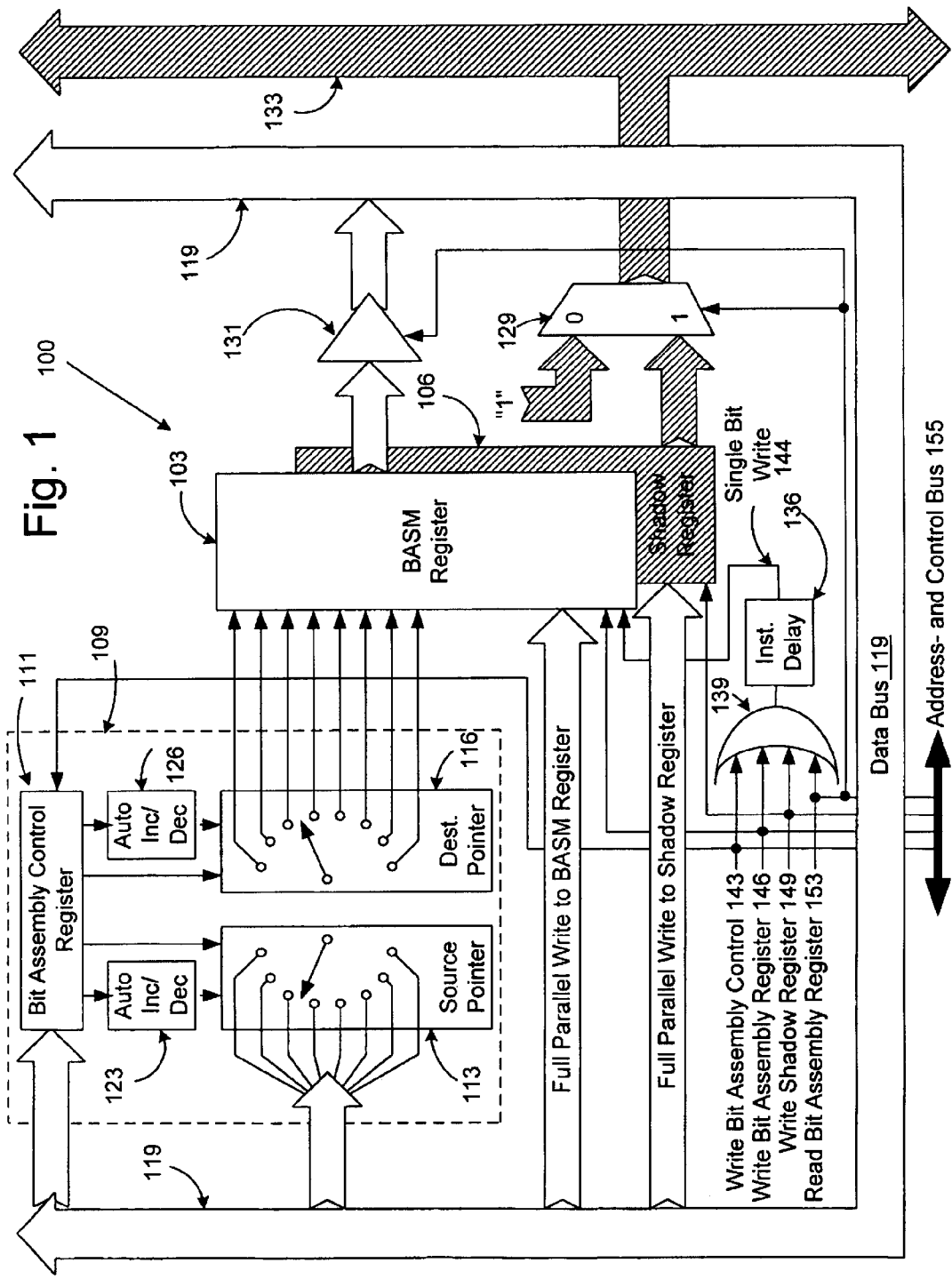
FIG. 1 is a block diagram of the bit assembly circuit according to an embodiment of the present invention.

Turning to FIG. 1, shown is a bit assembly circuit 100 according to the present invention. The bit assembly circuit 100 is advantageously designed to perform partial parallel data transfer on a parallel data bus 119 to facilitate a conversion between two predetermined data communications protocols. The bit assembly circuit 100 may be electrically coupled to a data bus, for example, in a programmable digital processor circuit employed to accomplish the data communications protocol conversion such as the processor circuit shown in United States Patent application, entitled "System and Method for Protocol Conversion in a Data Communications System", filed on even date herewith, and assigned Ser. No. 09/164,969, the entire text of which is incorporated herein by reference.

The bit assembly circuit 100 comprises a bit assembly register 103 with a corresponding shadow register 106 and a bit routing circuit 109. The bit routing circuit 109 includes a bit assembly control register 111 which is electrically coupled to a source pointer 113 and a destination pointer 116. Both the source pointer 113 and the bit assembly control register 111 are electrically coupled to a data bus 119. The source and destination pointers 113 and 116 are electrically coupled to the bit assembly control register 111 both directly and through a source increment/decrement circuit 123 and a destination increment/decrement circuit 126, respectively.

Note that the bit assembly register 103 includes a predetermined number of register positions for storing a data block. The register positions may comprise a single D flip-flop or other component with similar capabilities. In the preferred embodiment, the predetermined number of register positions is equal to the parallel bit handling capacity of the data bus 119. In the preferred embodiment of the present invention, there are eight register positions to accommodate a single byte of data. The shadow register 106 includes a number of register positions equal to the number of register positions of the bit assembly register 103.

Both the bit assembly register 103 and the shadow register 106 are electrically coupled to the data bus 119 to facilitate full parallel writes, i.e. a data bit is written on each conductor of the data bus 119, via the data bus 119. A full parallel write is one which uses the entire width of the data bus 119 where each conductor contains a data bit. The data content of the bit assembly register 103 may also be read from the bit assembly register 103 through the data bus 119. The bit assembly control register 111, source pointer 113, bit assembly register 103, and the shadow register 106 each have individual addresses by which these components are enabled via a address/control bus in an overall processor circuit of which the bit assembly circuit 100 is a part.

The bit assembly circuit 100 further comprises a shadow multiplexer 129 with a first input coupled to the output of the shadow register 106 and a second input coupled to a logical "1". The output of the shadow multiplexer 129 is electrically coupled to a shadow bus 133. Note that the shadow multiplexer 129 couples either the "valid" data bits of the shadow register 106 or a number of logical "1s" to the conductors of the shadow register 106. Also note that the output of the bit assembly register 103 is coupled to the data bus 119 via an output driver 131.

The bit assembly circuit 100 further includes an instruction delay 136 which has an input coupled to a trigger OR gate 139. The output of the instruction delay 136 is a single bit write signal 144. The trigger OR gate 139 includes four inputs, each input receiving one of a write bit assembly control signal 143, a write bit assembly register signal 146, a write shadow register 149, and a read bit assembly register 153. The write bit assembly control signal 143, write bit assembly register signal 146, write shadow register 149, and read bit assembly register 153 are received via a control and address bus 155.

Next the operation of the bit assembly circuit 100 is explained. The operation of the bit assembly circuit 100 can be explained in the context of two separate stages. First, is a partial parallel data block assembly stage and, second, is a partial parallel write stage.

Starting with the partial parallel data block assembly stage, the bit routing circuit 109 is employed to write any single bit from the data bus 119 to any register position in the bit assembly register 103. A full parallel write is performed to the bit assembly control register 111 through the data bus 119 which indicates the particular data bit of the data bus 119 to be routed, as well as the particular register position of the bit assembly register 103 to receive the routed data bit. Data from the data bus 119 is written to the bit assembly control register 111 when the write bit assembly control signal 143 is a logical "1".

The bit assembly control register 111 triggers the source increment/decrement circuit 123 to cause the source pointer 113 to access a particular bit on the data bus 119. The bit assembly control register 111 further triggers the destination increment/decrement circuit 126 to cause the destination pointer 116 to route the bit received from the source pointer 113 to a particular register position in the bit assembly register 103. The source pointer 113 and the destination pointer 116 both are shown as a switching device which represents a solid state switching circuit to accomplish the routing task.

To perform a bit write to the bit assembly register 103, a data value is placed onto the data bus 119 and the write bit assembly control 143 is set to a logical "1" and the data is written to the bit assembly control register 111. At the same time, the write bit assembly control signal 143 also "primes" the instruction delay so that the single bit write signal 144 is a logical "1" on the next instruction.

Anytime the single bit write signal 144 is a logical "1", any register write to the bit assembly register 103 is routed through the bit routing circuit 109. When the single bit write signal 144 is a logical "0", any write to the bit assembly register 103 is a full parallel write. Thus, in order to perform a bit write to the bit assembly register 103, the instruction delay is "primed" by a prior instruction which can be one of the write bit assembly control signal 143, write bit assembly register signal 146, write shadow register 149, or the read bit assembly register 153.

Thus after the single bit write signal 144 is primed by write that occurred to the bit assembly control register 111 (due to the write bit assembly control signal 143), a data value containing the particular bit to be read to the bit assembly register is written to the data bus 119. Thereafter, the write bit assembly register signal 146 is set to a logical "1" and the particular data bit is written from the data bus 119 to the particular bit position of the bit assembly register 103 via the bit routing circuit 109.

In this manner, the predetermined bits are read to the desired register positions of the bit assembly register 103 via the bit routing circuit 109. With each bit placed in the bit assembly register 103, a logical "1" read to the corresponding register position of the shadow register 106 to indicate that the data bit written is valid.

In addition, a full parallel write may be executed to the bit assembly register 103 through the data bus 119. In such a case, a full parallel write is performed to the bit assembly register 103 without priming the instruction delay 136. This is accomplished by simply placing the full parallel write onto the data bus 119 and then setting the write bit assembly register 146 to a logical "1". In this case, the parallel write is made before the single bit write signal 144 is set to a logical "1". The fact that the single bit write signal is set to a logical "1" thereafter is of little consequence since the full parallel write has already occurred and it is unlikely that a single bit write to the bit assembly register 103 will be made immediately thereafter. Corresponding bits are written to the shadow register 106 when the full parallel write is made to the bit assembly register 103.

The instruction delay 136 may also be primed by a full parallel write to the shadow register 149 as shown. Such a write is perform in the same manner as a full parallel write to the bit assembly register 103 as described above. This allows one to bypass the automatic shadow bit setting operations of the bit assembly register 103 every time it receives bitwise or full parallel data. Note that the bit assembly register 103 may be cleared by a full parallel write of logical "0s" to the shadow register 106 indicating that all bit assembly register positions hold invalid data.

Note that both the source increment/decrement circuit 123 and destination increment/decrement circuit 126 may be set to automatically cycle the source pointer 113 and the destination pointer 116 to the next position for each subsequent bit write, or the source increment/decrement circuit 123 and destination increment/decrement circuit 126 can be bypassed altogether and the source pointer 113 and the destination pointer 116 receive position data directly from the bit assembly control register 111, depending upon the precise instruction written to the bit assembly control register 111.

Once the bit assembly register 103 receives the complete partial parallel data block with which to perform a partial parallel write, then the second stage of the bit assembly circuit operation is performed in which a partial parallel write is performed. This includes a partial parallel bit read from the bit assembly register 103 which is ultimately written to a target destination register (not shown) in the overall processor circuit which also includes a shadow register to indicate valid data in the partial parallel data block.

Once the partial parallel data block is assembled on the bit assembly register 103 with its corresponding shadow bits on the shadow register 106, these values are transferred to a target register in a partial parallel write by setting the read bit assembly register signal 153 to a logical "1" which causes the output driver 131 to place the contents of the bit shift register 103 onto the data bus 119. At the same time, the bit assembly register signal 153 also causes the shadow multiplexer 129 to place the contents of the shadow register 106 onto the shadow bus 133. In this manner, the target register will receive both the partial data block via the data bus 119 and the bit validity information via the shadow bus 133 during the performance of a partial parallel write. Note that a logical "1" is transmitted on the shadow bus 133 when it is not being used for a partial parallel write because it enables the destination target registers to receive a full parallel write from another source register.

Also, the read bit assembly register 153 primes the instruction delay 136 through the trigger OR gate 139 which enables a bit write to the bit assembly register 103 in a subsequent instruction.

Many variations and modifications may be made to the preferred embodiment of the invention without departing substantially from the spirit and principles of the invention. All such modifications and variations are intended to be included herein within the scope of the present invention, as defined by the following claims.

What is claimed is:

1. A circuit for performing a partial parallel data transfer, comprising:

a bit assembly register;

a shadow register;

a bit routing circuit configured to transfer at least one data bit to a predetermined register position in the bit assembly register and to set a shadow bit in a corresponding register position in the shadow resister for each data bit transferred to the bit assembly register, the shadow bit indicating the validity of the data bit;

a shadow bus electrically coupling the shadow register to at least one destination shadow register, wherein the shadow bits stored in the shadow register are transferred to the destination shadow register over the shadow bus; and a multiplexer for alternating between transferring the shadow bits stored in the shadow register and transferring a logical "1" onto the shadow bus for all of the shadow bits.

2. The circuit of claim 1, further comprising:

a first full parallel interface between the bit assembly register and a data bus, the first full parallel interface configured to write a full parallel data block to the bit assembly register;

and a second full parallel interface between the shadow register and the data bus, the second full parallel interface configured to write a full parallel data block to the shadow register.

3. The circuit of claim 1, wherein the bit routing circuit further comprises:

a bit routing control circuit;

a source pointer configured to enable a predetermined bit input from a data bus based on a source routing signal from the bit routing control circuit; and a destination pointer configured to enable a predetermined bit output to the bit assembly register based on a destination routing signal from the bit routing control circuit.

4. The circuit of claim 3, wherein the source pointer is cycled through the predetermined bit inputs according to a source increment/decrement signal generated by a source increment/decrement circuit.

5. The circuit of claim 3, wherein the destination pointer is cycled through the predetermined bit inputs according to a destination increment/decrement signal generated by a destination increment/decrement circuit.

6. A circuit for performing a partial parallel data transfer, comprising:

means for assembling a partial parallel data block from at least one data bit in a full parallel data block for transfer to a destination register;

means for transferring the partial parallel data block to the destination register; and means for indicating individually the validity of each data bit in the partial parallel data block transferred to the destination register.

7. The circuit of claim 6, wherein the means for indicating individually the validity of each data bit in the partial parallel data block transferred to the destination register further comprises:

means for assembling a parallel shadow data block having a predetermined number of shadow bits corresponding to the data bits of the partial parallel data block; and means for transmitting the parallel shadow data block to a shadow destination register associated with the destination register.

8. The circuit of claim 7, wherein the means for indicating individually the validity of each data bit in the partial parallel data block transferred to the destination register further comprises means for triggering the transfer of the parallel shadow data block to the shadow data register.

9. The circuit of claim 7, wherein the means for indicating individually the validity of each data bit in the partial parallel data block transferred to the destination register further comprises means for transmitting a shadow data block indicating a full parallel data transfer.

10. The circuit of claim 6, wherein the means for assembling the partial parallel data block from at least one data bit in a full parallel data block further comprises:

means for storing the partial parallel data block; and means for routing the data bit into a predetermined position of the partial parallel data block.

11. A method for performing a partial parallel data transfer, comprising the steps of:

assembling a partial parallel data block from at least one data bit in a full parallel data block for transfer to a destination register;

transferring the partial parallel data block to the destination register; and indicating individually the validity of each data bit in the partial parallel data block transferred to the destination register.

12. The method of claim 11, wherein the step of indicating individually the validity of each data bit in the partial parallel data block transferred to the destination register further comprises the steps of:

assembling a parallel shadow data block having a predetermined number of shadow bits corresponding to the data bits of the partial parallel data block; and transmitting the parallel shadow data block to a shadow destination register associated with the destination register.

13. The method of claim 12, wherein the step of indicating individually the validity of each data bit in the partial parallel data block transferred to the destination register further comprises the step of triggering the transfer of the parallel shadow data block to the shadow data register.

14. The method of claim 12, wherein the step of indicating individually the validity of each data bit in the partial parallel data block transferred to the destination register further comprises the step of transmitting a shadow data block indicating a full parallel data transfer.

15. The method of claim 11, wherein the step of assembling the partial parallel data block from at least one data bit in a full parallel data block further comprises the steps of:

storing the partial parallel data block; and routing the data bit into a predetermined position of the partial parallel data block.

16. A circuit for performing a partial parallel data transfer, comprising:

a bit assembly register;

a shadow register; and a bit routing circuit configured to transfer at least one data bit to a predetermined register position in the bit assembly register and to set a shadow bit in a corresponding register position in the shadow register for each data bit transferred to the bit assembly register, the shadow bit indicating the validity of the data bit.

17. The circuit of claim 16, further comprising:

a first full parallel interface between the bit assembly register and a data bus, the first full parallel interface configured to write a full parallel data block to the bit assembly register; and a second full parallel interface between the shadow register and the data bus, the second full parallel interface configured to write a full parallel data block to the shadow register.

18. The circuit of claim 16, further comprising a shadow bus electrically coupling the shadow register to at least one destination shadow register, wherein the shadow bits stored in the shadow register are transferred to the destination shadow register over the shadow bus.

19. The circuit of claim 16, further comprising a multiplexer for alternating between transferring the shadow bits stored in the shadow register and transferring a logical "1" onto the shadow bus for all of the shadow bits.

20. The circuit of claim 16, wherein the bit routing circuit further comprises:

a bit routing control circuit;

a source pointer configured to enable a predetermined bit input from a data bus based on a source routing signal from the bit routing control circuit; and a destination pointer configured to enable a predetermined bit output to the bit assembly register based on a destination routing signal from the bit routing control circuit.

21. The circuit of claim 20, wherein the source pointer is cycled through the predetermined bit inputs according to a source increment/decrement signal generated by a source increment/decrement circuit.

22. The circuit of claim 20, wherein the destination pointer is cycled through the predetermined bit inputs according to a destination increment/decrement signal generated by a destination increment/decrement circuit.

* * * * *